United States Patent [19]

Sweet et al.

[11] 4,193,475

[45] Mar. 18, 1980

[54] RIGID RAIL SAFETY DEVICE

[75] Inventors: Robert P. Sweet; Daniel L. Stember, both of Red Wing, Minn.

[73] Assignee: D B Industries, Inc., Red Wing, Minn.

[21] Appl. No.: 854,152

[22] Filed: Nov. 23, 1977

Related U.S. Application Data

[63] Continuation-in-part of Ser. No. 680,281, Apr. 26, 1976, Pat. No. 4,071,926, which is a continuation-in-part of Ser. No. 468,568, May 9, 1974, Pat. No. 3,979,797.

[51] Int. Cl.[2] .......................... E06C 5/36; A62B 1/16; E06C 7/18; F16G 11/00

[52] U.S. Cl. ...................................... 182/8; 24/136 R

[58] Field of Search ...................... 182/8, 9; 24/136 R, 24/134 R

[56] References Cited

U.S. PATENT DOCUMENTS

| | | | |
|---|---|---|---|
| 3,348,632 | 10/1967 | Swager | 182/8 |
| 3,523,591 | 8/1970 | Fountain | 182/8 |
| 3,693,725 | 9/1972 | Tonsfeldt | 403/396 |
| 3,908,791 | 9/1975 | Kleine | 182/8 |
| 4,071,926 | 2/1978 | Sweet | 182/8 |

FOREIGN PATENT DOCUMENTS

| | | | |
|---|---|---|---|
| 1336836 | 7/1963 | France | 182/8 |
| 43845 | 3/1966 | German Democratic Rep. | 182/9 |
| 1218432 | 1/1971 | United Kingdom | 182/9 |

*Primary Examiner*—Reinaldo P. Machado

*Attorney, Agent, or Firm*—Williamson, Bains, Moore & Hansen

[57] ABSTRACT

A safety clamp slidably mounted on a vertical safety rail in proximity to a ladder is attached to a workman's belt by a pivotal actuating arm which shifts a wedge plate into clamping engagement with a safety carrier immediately under free fall conditions encountered if the workman falls from the ladder. The rail is spaced from the ladder mounting brackets by circular sleeves.

13 Claims, 7 Drawing Figures

FIG. 1
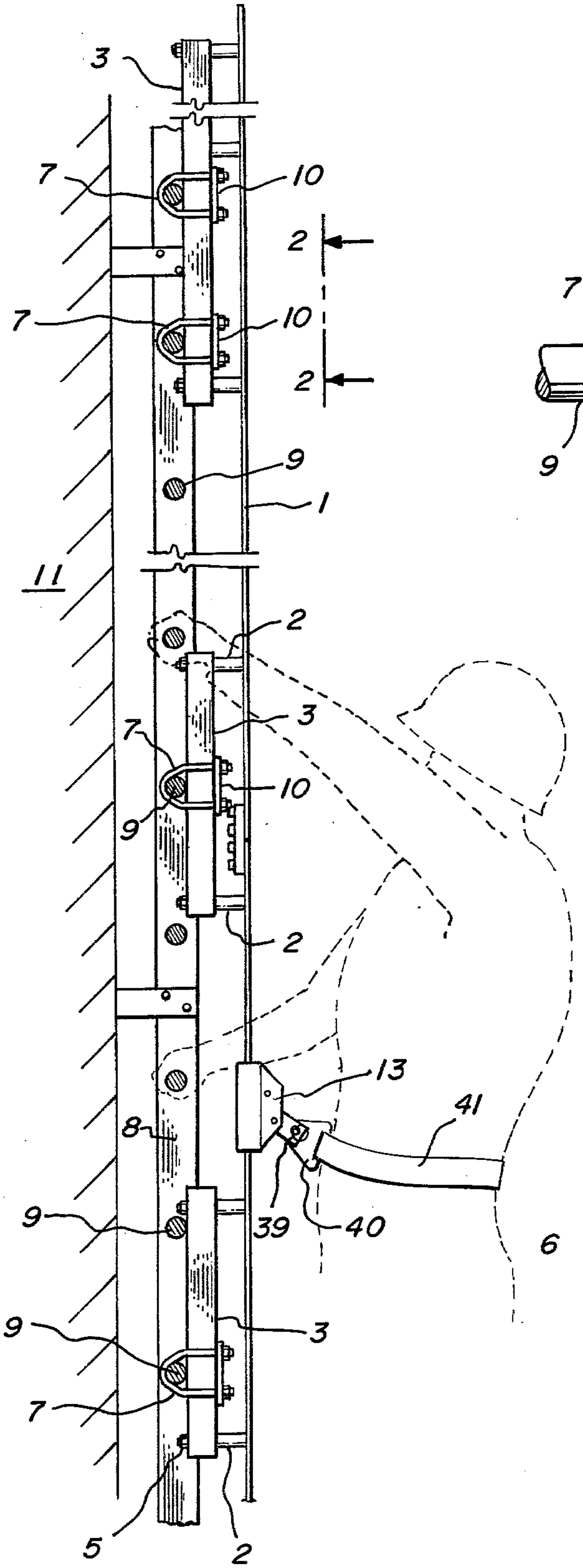
FIG. 2
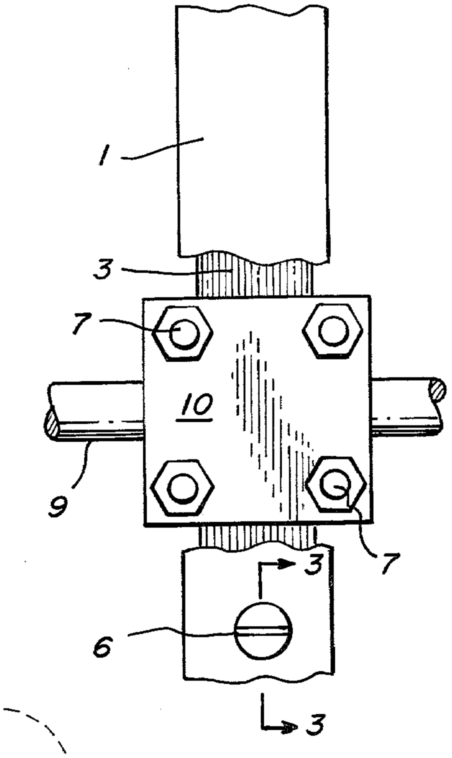
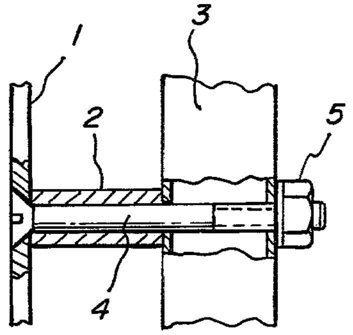
FIG. 3

FIG. 5
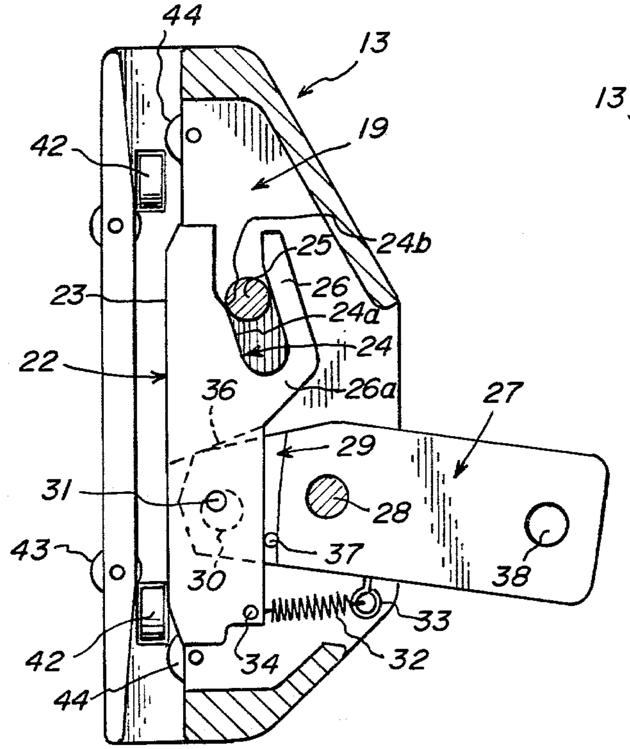
FIG. 7
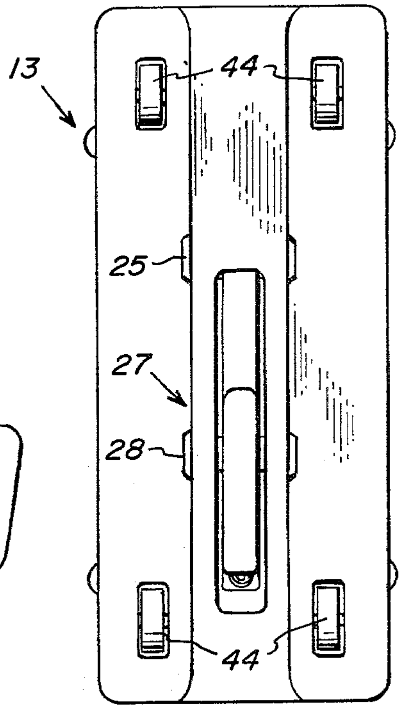
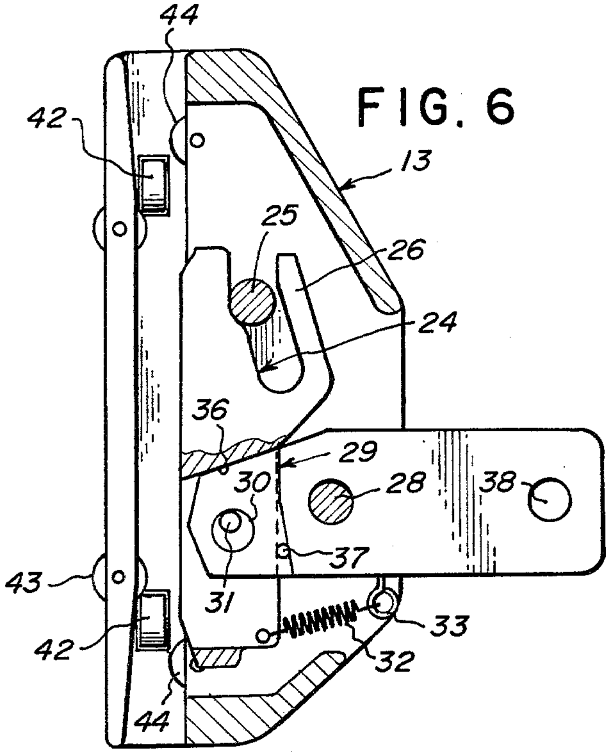
FIG. 6
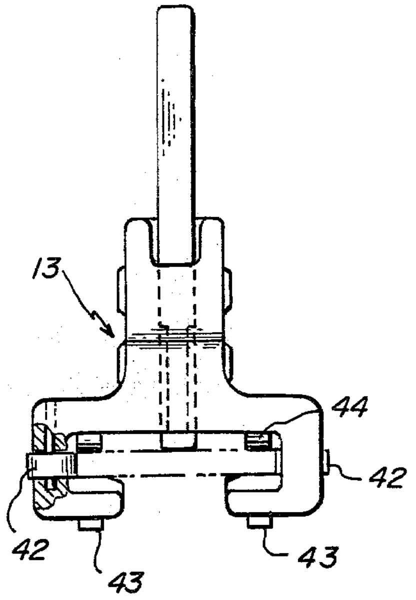
FIG. 4

RIGID RAIL SAFETY DEVICE

BACKGROUND OF THE INVENTION

This application is a continuation-in-part of an earlier commonly assigned application, Ser. No. 680,281, filed Apr. 26, 1976, now U.S. Pat. No. 4,071,926 which in turn is a continuation-in-part of commonly assigned U.S. Pat. No. 3,979,797 Ser. No. 468,568, filed May 9, 1974.

Safety clamp devices adapted to be attached to a workman's belt and having a friction plate or shoe which is moved into gripping engagement with the safety line if the workman falls have been known and in use for many years. See, for example, U.S. Pat. No. 3,317,971 issued to R. E. Meyer on May 9, 1967 and U.S. Pat. No. 3,492,702 issued to L. R. Stafford on Feb. 3, 1970. Also of note is the U.S. Pat. No. 3,348,632 to W. E. Swager which discloses a safety climbing device wherein the device is freely slidable on an I-shaped beam and provides a serrated cammed gripping device for clamping on the beam in the event of the fall of a workman. The primary problem has been the inability of prior safety clamps to satisfactorily meet the dual requirements of being freely slidable on the safety cable or rail as the workman goes up and down the ladder and yet quickly and positively shiftable into clamping engagement with a safety rail or cable when the workman falls. The safety clamp of this invention incorporates a combination of features which overcome the aforesaid difficulties encountered with previously known safety clamps. Foremost among such features are a camming system which instantly urges a wedge plate through a rail clearance space into uniform engagement with a safety rail over the entire length of the wedge plate under free fall conditions and the mounting actuation of the wedge plate so as to permit the friction force of a safety rail acting on it to draw it into very tight gripping engagement with the rail. The safety rail of this invention is capable of flexing about a horizontal axis parallel to the ladder rungs upon which the rail is mounted to permit the track to conform to various curved ladders. The rail is spaced from mounting brackets by sleeves in order to permit the safety clamp to grip a larger portion of the safety rail as well as to provide a more economical mounting arrangement.

BRIEF SUMMARY OF THE INVENTION

The safety clamp of this invention is particularly characterized by a wedge plate and actuating arm assembly mounted on a clamping bracket so as to provide free, unimpaired sliding movement of the clamping device along the safety rail during normal vertical movement of a workman on a ladder and to ensure the instantaneous, positive gripping of a safety rail between a wedge plate and an elongated clamping surface on the clamping bracket if the workman falls.

These basic objects and advantages have been realized by shiftably supporting an elongated wedge plate on a clamping bracket on one end of the pivotal actuating arm with an elongated clamping side of the wedge plate disposed in spaced apart relation to an elongated clamping surface on one edge of the clamping bracket with the extension of an elongated safety rail therebetween. A cam follower surface on one end of the wedge plate is disposed in coacting engagement with the camming member secured to the clamping bracket with the cam follower surface extending generally upwardly and inwardly toward the aforesaid bracket clamping surface. The outer free end of the actuating arm is provided with means for attachment to the safety belt of a workman and if a workman falls the tension spring connected between the actuating arm and the wedge plate will pivot the actuating arm outwardly and downwardly with the result that the inner end of the actuating plate will carry the wedge plate upwardly against the camming member. Engagement of a sharply inwardly contoured upper segment of the wedge plate cam follower surface with the camming member instantly urges the wedge plate upwardly and inwardly to a clamping position in engagement with a safety rail in response to the very slightest pivotal movement of the outer end of the actuating arm in the downward direction. The aforesaid camming member preferably takes the form of a pin extending horizontally across the clamping bracket in position between the wedge plate clamping surface and a guide finger affixed to the wedge plate in parallel spaced apart relation to the camming surface. The guide finger assists in keeping the wedge plate in a uniformly upright position parallel to the safety rail both during normal vertical movement of the clamp on the rail and the course of clamping movement against the rail. The pivotal mounting of the actuating arm on the clamping bracket in the driving association of the inner end of the actuating arm with the wedge plate in such a way that the actuating arm imparts an upward closing movement to the wedge plate is particularly advantageous. The upward frictional drag of a safety rail on the wedge plate under free fall conditions tends to draw the wedge plate toward its clamping or closing position. Thus, with the wedge plate's cam follower surface positioned between the camming member and the bracket clamping surface, frictional force of the safety rail will act to pull the wedge plate tightly between the camming member and the safety rail thereby resulting in increased holding power of the safety clamp on the safety rail.

To facilitate free sliding movement of the safety clamp on a safety rail, a substantial clearance space is provided between the clamping side of the wedge plate and the safety rail when the clamping bracket is mounted in its position for use on the rail. Roller assemblies are mounted so as to contact both sides of the rail as well as the edges thereof to ensure the free movement of the wedge plate and clamping bracket assembly up and down the safety rail during normal vertical movement of a workman. A particularly advantageous aspect of the improved safety clamp resides in provision of an inclined cam guide surface on the wedge plate which angles upwardly and outwardly in a direction away from the clamping side of the wedge plate. The actuating arm is arranged so that a camming surface on its inner end normally bears against the bottom end of the inclined cam guide surface. If the outer end of the actuating arm pivots downwardly under free falling conditions, its inner end will pivot upwardly and revolve against the wedge plates inclined cam guide surface and thereby assist in urging the wedge plate upwardly and inwardly towards its clamping position in gripping engagement with the safety rail. With the aforesaid upwardly and inwardly extending cam follower surface formed on the upper end of the wedge plate, the provision of this latter inclined cam guide surface on the lower end of the wedge plate ensures that the wedge plate will be maintained in a straight, upright position with its clamping side parallel to the bracket clamping surface into a safety rail as the wedge plate is moved into its clamping position. This mode of operation is further enhanced by the provision of a contact or camming element in the form of a laterally projecting pin on the inner end of the actuating arm. This pin normally bears against the outside edge of the bottom end of the wedge plate. As the actuating arm swings downwardly for clamping, this pin forces the bottom end of the wedge plate inwardly against the safety rail. Another particular advantage of the invention resides in the ease and simplicity with which the safety rail may be manufactured and installed. A rail which is horizontal in cross section is installed parallel to the longitudinal extent of the ladder at the center of the ladder and preferably spaced outwardly from the plane of the rungs of the ladder. Mounting brackets are fastened with U-shaped bolts to the ladder rungs at desired spacings. The safety rail is then fastened to these mounting brackets. The rail itself is spaced from the mounting brackets by tubular sleeves through which run the fastening bolts. The heads of the fastening bolts are counter-sunk into the surface of the safety rail so as to present a smooth surface to the clamping device.

These and other objects and advantages of the invention will become readily apparent as the following description is read in conjunction with the accompanying drawings wherein like reference numerals have been used to designate like elements throughout the several views.

BRIEF DESCRIPTION OF THE DRAWINGS

FIG. 1 is a side view of the safety rail and associated mounting arrangement;

FIG. 2 is a cut-away sectional view taken along lines 2—2 of FIG. 1;

FIG. 3 is a cut-away sectional view taken along lines 3—3 of FIG. 2;

FIG. 4 is a top plan view of the safety clamp structure;

FIG. 5 is a vertical sectional view of the safety clamp taken along lines 5—5 of FIG. 4;

FIG. 6 is a vertical sectional view of the safety clamp similar to FIG. 5 with additional portions cut away and showing the wedge plate of the safety clamp actuated to its clamping position; and FIG. 7 is a side plan view of the safety clamp structure viewed from the side facing the ladder.

DESCRIPTION OF THE PREFERRED EMBODIMENT

The safety clamp of this invention has been developed for use by workmen working on ladders fixed or removable in any kind of servicing or work environment at an elevated level. It is anticipated that the improved safety clamp will find particularly widespread application with respect to fixed ladders such as those mounted on smokestacks, water tanks, storage tanks, grain elevators and towers and poles of various kinds. In FIG. 1, reference numeral 11 designates an upright portion of such a stack, tank or tower structure to which a fixed ladder 8 having rungs 9 is rigidly secured. There are located at desired intervals mounting brackets 3 having a generally rectangular cross section. Mounting brackets are secured to ladder rungs 9 by U-bolts 7 in corresponding locking plates 10 on the other side of the mounting bracket. A rigid safety rail 1 is then mounted on the mounting brackets at spaced locations. Bolts 4 having tapered heads 6 secure the safety rail to the mounting bracket along with nut 5. The safety rail is provided with a counter-sunk hole corresponding to the taper of the bolt head 6 which provides for flush mounting of bolt head 6. The safety rail 1 is spaced from the mounting bracket 3 by a tubular sleeve 2 which has a bore sized to accommodate the bolt 4. Safety rail 1 is rectangular in cross section and relatively thin so as to permit bending around a horizontal axis such that the safety rail may follow the contours of curved ladders. The elongated vertically extending safety rail 1 is positioned adjacent to the ladder preferably centrally of the ladder in front.

As shown in FIGS. 5 through 7 the safety clamp is comprised of a clamping bracket generally indicated by reference numeral 13. Clamping bracket 13 preferably takes the form of an elongated T-shaped member having a base generally at 14 in a cross piece 15. The clamping member is also provided with a longitudinally extending T-shaped carrier rail retaining slot 16. The clamping member also has retaining fingers 17 which act to retain the safety rail 1 within the slot and give it the T-shape. Joining the retaining finger 17 to the base 15 of the T are side retaining walls 18. The clamping bracket 13 is also formed with a cavity designated 19 in FIG. 5 for holding the clamping mechanism. The inside surface of retaining fingers 17 act as a clamping surface 17*a* which is constructed and arranged to bear against one side of safety rail 1 with clamping bracket 13 slidably mounted thereon in an upright position of use. With clamping bracket 13 so mounted on carrier rail 1 clamping surface 17*a* will extend generally parallel to safety rail 1. Shiftably supported on clamping bracket 13 between opposed cavity sidewalls 20 and 21 is a wedge plate 22. When assembled in its position of use as shown, wedge plate 22 will be contained between clamping bracket cavity side walls 20 and 21 parallel thereto in an upright position. Wedge plate 22 is so mounted on clamping bracket 13 that the inner elongated clamping side 23 of wedge plate 22 extends parallel to clamping surfaces 17*a* of bracket 13 in spaced apart relation thereto so as to accomodate the extension of safety rail 1 therebetween. Cam follower surface generally indicated by reference numeral 24 formed on the upper end of wedge plate 22 is positioned in coacting engagement with the stationary cam member 25 when wedge plate 22 is mounted in its normal position of use on bracket 13. For purposes hereinafter explained, cam follower surface 24 is comprised of a lower, inclined cam follower surface 24*a* in an upper more sharply contoured surface segment 24*b*. Cam follower surface 24 extends generally upwardly and inwardly from its lower end towards bracket clamping surface 17*a* and is disposed between camming member 25 in bracket clamping surface 17*a* in the manner shown. A guide finger 26 is affixed to wedge plate 22 in spaced apart relation to cam follower surface 24. Base end 26*a* of finger 26 is attached to wedge plate 22 as an extension thereof as shown in FIGS. 5 and 6. The parallel position and configuration of the inner surface of finger 26 with respect to cam follower surface 24 permits the desired movement of wedge plate 22 towards safety rail 1 in a manner hereinafter explained.

Camming member 25 preferably takes the form of a cylindrical pin mounted transversely on a clamping bracket 13 across its cavity sidewalls 20 and 21 so as to extend generally horizontally in its position of use as shown. Camming pin 25 is positioned between camming surface 24 and guide finger 26 with sufficient clearance space being provided between pin 25 and the inner surface of finger 26 to avoid interference with desired clamping movement of wedge plate 22 against safety rail 1. Pin 25 may be a commercially available holding pin having a spring loaded detent 25*a* at one end and an enlarged head on its opposite end by means of which it is held in place on bracket 13. For the purposes of cooperative co-action between the camming member 25 and cam follower surface 24, upper cam follower surface 24*b* is of arcuate shape and conforms to the shape of cylindrical camming pin 25. With wedge plate 22 in its rest or release position shown in FIG. 6, upper cam follower surface 24*b* will be positioned in engagement with camming pin 25. Arcuate camming surface 24*b* is contoured upwardly and sharply inwardly in a direction towards bracket clamping surfaces 17*a* in a manner shown most clearly in FIG. 5 to provide an initial rapid thrust of wedge plate 22 towards safety rail 1 in bracket clamping surfaces 17*a* and explained below with respect to the operation of the safety clamp. Lower inclined cam follower surface segment 24*a* also is directed upwardly and inwardly towards bracket clamping surfaces 17*a* but is contoured less sharply inwardly towards clamping surfaces 17*a* from the vertical than arcuate surface segment 24*b*.

Wedge plate 22 is supported on the inner end of an actuating arm 27 which is removably attached to clamping bracket 13 by means of a pivot pin 28 extending transversely through bracket sidewalls 20 and 21 in a direction parallel to camming pin 25. Like camming pin 25, pivot pin 28 is removable and is held in place by a spring loaded detent 28*a* on one end thereof. As appears most clearly in FIGS. 5 and 6, the bottom end of wedge plate 22 is bifurcated to form a pair of spaced apart downwardly extending plate segments 22*a* and 22*b*. The inner end 29 of actuating arm 27 is of reduced thickness and is received between plate segments 22*a* and 22*b* of wedge plate 22 thereby serving to support wedge plate 22 between pivot pin 28 in bracket clamping surfaces 17*a* to ensure positive driving association between the inner end of actuating arm 27 in wedge plate 22. These parts are mechanically linked together by means of a circular aperture and pin connection 30, 31. Aperture 30 extends through the inner end 29 of actuating arm 27 and pin 31 extends transversely through aperture 30 as well as through plate segments 22*a* and 22*b* of wedge plate 22. It is affixed thereto as appears most clearly in FIGS. 5 and 6.

The tension spring 32 is connected between actuating arm 27 in the bottom end of wedge plate 22 as shown in FIGS. 5 and 6 so as to normally exert a downward biasing force from the outer end of actuating arm 27. Spring 32 is connected between an attachment eye 33 on the bottom of arm 27, extending outwardly from its pivot pin connection 28 to wedge plate 22 to a pin 34 secured between the bottom ends of wedge plate segments 22*a* and 22*b* as shown in FIGS. 5 and 6. Spring 32 is sufficiently strong that under free fall conditions of the entire clamping bracket assembly on safety rail 1, it will pivot the outer end of actuating arm 27 downwardly about horizontally extending pivot pin 28 with the result that the inner end 29 of arm 27 will drive wedge plate 22 upwardly toward its closing or clamping position against safety rail 1. The attachment of actuating arm 27 to pivot pin 28 at a location between the outer free end of arm 27 in the location of driving association of its inner end 29 with wedge plate 22 through connecting pin 31 ensures that wedge plate 22 will be driven upwardly in its closing movement toward safety rail 1 as the outer end of actuating arm 27 pivots downwardly.

For purposes hereinafter explained, a camming surface 35 is formed on the top edge of inner end 29 of actuating arm 27 and normally bears against the bottom of inclined guide surface 26 formed on the wedge plate 22. Inclined guide surface 36 is located at the juncture of the upper ends of wedge plate bottom segments 22*a* and 22*b* at a location below cam follower surface 24. The upper edge of the inner end 29 of actuating arm 27 is angled as shown in FIG. 5 to conform to the shape of inclined cam guide surface 36 and will be disposed directly thereunder with actuating arm inner end 29 extending between wedge plate bottom segments 22*a* and 22*b*.

A further camming element is provided in the form of a laterally projecting pin 37 on the inner end of actuating arm 27. Pin 37 extends transversely through arm 27 and is affixed thereto as shown in FIGS. 5 and 6. The projecting ends of pin 37 normally bear against the outside edges of the lower ends of wedge plate bottom segments 22*a* and 22*b*. As illustrated in FIGS. 1 and 5, the outer free end of actuating arm 27 has an aperture 38 extending therethrough within which a removable pin 39 is received. The outer end of arm 27 projects outwardly away from clamping bracket 13 a sufficient distance that it may be readily received through an aperture in a buckle bracket 40. A belt 41 worn by a workman is extended through the buckle bracket whereby bracket 40 serves as a means for connecting actuating arm 27 and the entire safety clamp assembly to a workman.

In order to ensure uniformly free movement of the clamp assembly up and down a cable during normal vertical movement by a workman, several roller assemblies are incorporated into the clamp assembly 13. Two edge rollers 42 are situated in each edge retaining wall 18 as shown in FIGS. 4 and 5 so as to bear on the edge of the safety rail 1. Two more rollers 43 are located in each of the retaining fingers 17 so as to bear on the back side of safety rail 1 as shown in FIG. 7. Two more rollers 44 are located at each side of cross piece 15 as shown in FIGS. 4 and 5. These rollers allow unimpeded movement and prevent binding or camming of the safety clamp assembly 13 on the safety rail 1.

If desired, of course, pins 25 and 28 may be fixed rather than removable.

In operation clamping bracket 13 is slidably mounted on safety rail 1 at a desired location by slipping the bracket over the end of the safety rail 1. The spacer sleeves 2 project through the T-shaped slot opening 16 such that the safety clamp assembly 13 is freely slidable over the length of the safety rail assembly. With actuating arm 27 attached to a belt 41 of a workman through pin 39 in buckle 40, clamping bracket 13 will be free to slide up and down on rail 1 as the workman moves up and down on a ladder. When the workman is climbing, the upward movement of his body tends to pivot the outer end of actuating arm 27 through its connection with buckle 40 and the workman's belt 41 thereby holding arm 27 in its horizontal release position against the downward bias of tension spring 32. As the workman descends the ladder, the entire clamping bracket assembly, including actuating arm 27 will drop together with safety rail 1 and the attachment of actuating arm 27 to the workman's belt will resist the force of spring 32 tending to pivot arm 27 downwardly toward its closing or clamping position. Finger 26 resists the tendency of wedge plate 22 to shift or swing inwardly towards rail 1 and pin 37 prevents outward movement of wedge plate 22 away from rail 1 during such normal use. This wedge plate restraining and guiding function of finger 26 and pin 37 in cooperation with rollers 42, 43 and 44 ensures free movement of the clamp assembly up and down cable 4.

If however the workman should fall or otherwise lose control, the safety clamp will instantly lock onto safety rail 1 thus supporting the workman and preventing a fall. The rotation of the outer end of actuating arm 27 downwardly is caused by the weight of the workman being applied at the outer end of arm 27 through a safety belt 41 and belt clip or buckle 40. In the case of a free fall during which all of the components of a safety clamp assembly would normally fall together under the force of gravity, tension spring 37 imparts an unbalanced force to the outer end of arm 27 in a downward direction. As the outer end of arm 27 pivots downwardly about pivot pin 28, the inner end 29 of arm 27 pivots upwardly thereby driving wedge plate 22 upwardly between camming pin 25 and safety rail 1. Because of the fact that upper cam follower surface **24*b* is contoured sharply inwardly towards rail 1, the slightest upward motion of wedge plate 22 in response to the pivotal movement of actuating arm 27 in its closing direction will cause wedge plate 22 to instantly move across the clearance space between its clamping side 23 in rail 1 into secure clamping engagement with rail 1. As wedge plate 22 continues to move upwardly under the impetus of actuating arm 27, the engagement of upwardly and inwardly inclined cam follower surface 24*a* with camming pin 25 will force wedge plate 22 tightly against safety rail 1. As a result rail 1 is tightly clamped between clamping surface 17*a* of clamping bracket 13 in clamping side 23 of wedge plate 22 along the length of these two clamping surfaces. Moreover, since wedge plate 22 moves in an upward direction during its closing motion, the frictional drag of safety rail 1 on wedge plate 22 will tend to pull it even more tightly into clamping engagement with rail 1. This achieves particularly strong holding power for the safety clamp on rail 1**.

It is to be noted that the cam follower surface 24 is formed along the upper end of wedge plate 22 and thus tends to move the upper end of wedge plate 22 upwardly and inwardly towards safety rail 1 by engagement with the camming pin 25. The coaction of camming surface 35 on the inner end 29 of actuating arm 27 with inclined cam guide surface 36 during the closing movement of wedge plate 22 ensures that its lower end will move upwardly and inwardly uniformly with its upper end. As the inner end 29 of actuating arm 27 pivots upwardly under free fall conditions, its camming surface 35 will revolve against inclined guide surface 36. Since cam guide surface 36 inclines upwardly and outwardly as shown, the engagement of camming surface 35 therewith will assist in urging wedge plate 22 upwardly and inwardly along its entire length in a uniform manner in combination with the coaction between camming surface 24 and camming pin 25. Moreover, camming pin 37 on the inner end of arm 27 will be urged against the bottom end of wedge plate 22 as the inner end 29 of arm 27 swings upwardly. This provides a further positive driving force urging the lower end of wedge plate 22 against rail 1. As a result, wedge plate 22 is maintained in the upright position shown with its clamping side 23 parallel to bracket clamping surfaces **17*a* at all times as it moves from its release position of FIG. 6 to its clamping position as shown in FIG. 5**.

It is also to be noted that aperture 30 in inner end 29 of actuating arm 27 provides sufficient clearance space with connecting pin 31 extending therethrough to permit the necessary shifting movement of wedge plate 22 towards rail 1 and bracket clamping surface **17*a*. This particular manner of mechanically linking actuator arm 27 and wedge plate 22 further ensures that wedge plate 22 will be able to move upwardly and inwardly in a uniform manner over its entire length and thereby remain in an upright position parallel to rail 1 in clamping surfaces 17*a* as actuating arm 27 drives it into its clamping position. As this actuating pivotal movement of arm 27 takes place, the relatively large clearance space between arm aperture 30 in pin 31 allows the camming nose 35 of arm 27 to maintain contact with inclined surface 36 on wedge plate 22. Those skilled in the art will appreciate that the safety clamp described and shown herein provides a particularly rapid response and very strongly clamping action in frictional engagement with the safety rail under free fall conditions which might be encountered by a workman falling from a ladder. Rollers 42, 43 and 44 improve the ability of the clamping assembly to move freely up and down the safety rail. Further, the use of narrow spacer sleeves 2 allows a maximum amount of contact area particularly with gripping surfaces 17*a* to contact the safety rail 1** in order to provide superior frictional engagement. The sleeve and spacing arrangement also is advantageous in that it allows an easily adjustable system that may be constructed using inexpensive and readily available parts, i.e. a standard rail may be readily bent for installation on a curved ladder.

If desired, clamping bracket 13 may be constructed in two pieces splittable about the longitudinal axis so that the bracket may be mounted on the rail at any location intermediate the ends. The two pieces may be secured by pins or the like.

Although the improved safety clamp has been described with respect to a particular preferred embodiment thereof, I anticipate that various changes may be made in the size, shape and operation of the various components of the safety clamp without departing from the spirit and scope of my invention as defined in the following claims.

What is claimed is:

1. A safety rail system for mounting on a ladder, said system comprising:

an elongated rail having a substantially rectangular cross-section and being relatively thin whereby when said rail is installed with the elongation parallel to the longitudinal extent of the ladder, said rail may be easily bent about an axis parallel to the ladder rungs so as to follow ladder contours;

at least one mounting bracket for attachment to a plurality of said rungs;

means for attaching each said mounting bracket to a plurality of said rungs, said attaching means being infinitely adjustable along the length of said mounting bracket, and means for securing said rail to said brackets, in spaced relationship outwardly from said ladder and said brackets, said securing means comprising:

a plurality of bolts, said bolts having tapered heads;

a corresponding plurality of tubular spacers each of said spacers having a bore sized to accommodate one of said bolts, each of said spacers being of such length and diameter so as to allow a safety clamp to substantially encircle said safety rail;

said safety rail having a plurality of spaced countersunk holes to accommodate said bolt heads flush with the surface of said rail, thereby presenting a plane surface for gripping engagement; and said spacers being located between said mounting brackets and said rail, said bolt heads being located in said countersunk holes, said bolts fastening said rail to said brackets with said spacer bores accommodating said bolt therebetween.

2. The system of claim 1 further comprising safety clamping means for attachment to a worker in the event of a fall such that if the event of a fall, said clamping means lockingly engages said safety rail.

3. The device of claim 2 wherein said clamping means comprises:

a clamping bracket having an elongated clamping surface on one end thereof constructed and arranged to bear against one side of said elongated safety rail on which said bracket is adapted to be slidably mounted in an upright position with said clamping surface extending generally parallel to said safety rail;

a wedge plate shiftably supported on said bracket and having an elongated clamping side extending substantially parallel to said clamping surface of said bracket in spaced apart relation thereto for the extension of said elongated safety rail therebetween;

a cam follower surface on the upper end of said wedge plate disposed in coacting engagement with a camming member secured to said clamping bracket, with said cam follower surface positioned between said camming member and said bracket clamping surface, and said cam follower surface extending generally upwardly and inwardly towards said bracket clamping surface;

an actuating arm pivotally attached to said clamping bracket for pivotal movement about a horizontal axis and projecting outwardly therefrom away from said bracket clamping surface, the outer, free end of said arm having means thereon for attachment to a workman, and the inner end of said arm being drivingly associated with said wedge plate with the point of pivotal attachment of said actuating arm to said clamping bracket being between the outer, free end of said arm and the location of driving association of the inner end of said arm with said wedge plate whereby the upward pivotal movement of said arm inner end imparts upward movement to said wedge plate, and said cam follower surface being on a portion of said wedge plate above said location of driving association of the inner end of said arm with said wedge plate; and a camming element on the inner end of said actuating arm normally bearing against the lower end of said wedge plate at a location outwardly from said clamping side thereof and below said location of driving association of the inner end of said arm with said wedge plate, whereby a downward force generated on the outer end of said actuating arm will pivot the inner end of said arm upwardly, and the driving association of the inner end of said arm with said wedge plate will carry said wedge plate upwardly against said camming member to urge said wedge plate inwardly against said safety rail, with said camming element serving to simultaneously urge the lower end of said wedge plate inwardly against said safety rail as the inner end of said arm pivots upwardly.

4. The device as defined in claim 3 wherein:

said camming element is in the form of a pin protruding laterally from the inner end of said actuating arm and bearing against the outer side of said wedge plate opposite said clamping side thereof.

5. The device as defined in claim 3 wherein:

a tension spring is so connected between said actuating arm and said wedge plate as to normally exert a biasing force on the outer end of said actuating arm in a downward direction and thereby pivot said actuating arm inner end upwardly to move said wedge plate upwardly against said camming member.

6. The device as defined in claim 3 wherein:

said wedge plate has an inclined cam guide surface at a location thereon below said cam follower surface which angles upwardly and outwardly in a direction away from said clamping side of said wedge plate; and the inner end of said actuating arm has a camming surface thereon normally bearing against the bottom end of said inclined guide surface of said wedge plate in driving association therewith, whereby, as the inner end of said actuating arm pivots upwardly, said camming surface thereon will revolve against said inclined guide surface and thereby guide said wedge plate upwardly and inwardly and assist in maintaining said wedge plate in an upright position with its clamping side parallel to said bracket clamping surface as it moves to said clamping position against said camming member.

7. A safety device as defined in claim 6 wherein:

said inner end of said actuating arm has an aperture therethrough, and said arm is mechanically linked to said wedge plate by a pin extending transversely through said wedge plate and aperture, and affixed to said wedge plate, there being sufficient clearance between said pin and said aperture to permit unrestrained clamping movement of said wedge plate upwardly and inwardly towards said safety rail in response to the driving action of said arm camming surface against said inclined guide surface of said wedge plate.

8. A safety device as defined in claim 3 wherein:

at least one roller is rotatably mounted to said bracket in position to be in direct alignment with said safety rail on which said clamping means is mounted, said roller serving to assist the smooth, free movement of said means up and down said safety rail by rolling contact therewith, during normal vertical movement of said safety device with a workman.

9. A safety device as defined in claim 3 wherein:

said camming member is a pin mounted transversely on said clamping bracket and extending generally horizontally in its position of use; and a guide finger affixed to said wedge plate in spaced apart relation thereto with its inner surface parallel to said cam follower surface, and said camming pin being positioned between said cam follower surface and said guide finger.

10. The device of claim 2 wherein said clamping means comprises:

a clamping bracket having an elongated clamping surface on one end thereof constructed and arranged to bear against one side of an elongated safety carrier on which said bracket is adapted to be slidably mounted in an upright position with said clamping surface extending generally parallel to the safety carrier, said bracket being in the form of an elongated, U-shaped member defined by opposed, spaced apart side walls joined together at their inner ends by an upright end wall segment which forms said bracket clamping surface;

a wedge plate shiftably supported on said bracket between said bracket side walls in an upright position and having an elongated clamping side extending substantially parallel to said bracket clamping surface in spaced apart relation thereto for the extension of an elongated safety carrier therebetween;

a cam follower surface on one end of said wedge plate disposed in coacting engagement with an elongated camming member extending transversely between said bracket side walls and secured thereto, said cam follower surface being positioned between said elongated camming member and said bracket clamping surface and extending generally upwardly and inwardly toward said bracket clamping surface;

an elongated guide finger affixed to said wedge plate in spaced apart, parallel relation to said cam follower surface thereon with said elongated camming member being positioned between said guide finger and said cam follower surface; and an actuating arm pivotally attached to said clamping bracket for pivotal movement about a horizontal axis and projecting outwardly away from said bracket clamping surface, the outer, free end of said arm having means thereon for attachment to a workman, the inner end of said arm having contact means thereon drivingly associated with said wedge plate for imparting upward movement to said wedge plate as the outer end of said arm pivots downwardly, and said arm inner end being mechanically linked to said wedge plate by a pin and aperture connection providing sufficient clearance to permit unrestrained clamping movement of said wedge plate upwardly and inwardly towards a safety rail, whereby, with said clamping bracket in said upright position, a downward force on the outer end of said actuating arm will pivot the inner end of said arm upwardly, with the result that the inner end of said arm will carry said wedge plate upwardly against said elongated camming member, whereby said wedge plate will be urged upwardly and inwardly to a clamping position with its clamping side brought into engagement with an elongated safety carrier to clamp said carrier between said bracket clamping surface and said clamping side of said wedge plate.

11. The device as defined in claim 10 wherein:

said wedge plate has an inclined cam guide surface at a location thereon below said cam follower surface which angles upwardly and outwardly in a direction away from said clamping side of said wedge plate; and the inner end of said actuating arm has a camming surface thereon normally bearing against the bottom end of said inclined guide surface of said wedge plate in driving association therewith, whereby, as the inner end of said actuating arm pivots upwardly, said camming surface thereon will revolve against said inclined guide surface and thereby guide said wedge plate upwardly and inwardly and assist in maintaining said wedge plate in an upright position with its clamping side parallel to said bracket clamping surface as it moves to said clamping position against said camming member.

12. The safety rail system of claim 1 wherein said attaching means comprises a plurality of clamping members.

13. The safety rail system of claim 12 wherein each of said clamping members comprises at least one u-bolt sized to fit about said rungs at least one plate member for engagement with said u-bolt and clamping said mounting bracket between said rung and said plate, and means restraining and positioning said u-bolt relative to said plate.

* * * * *